US009644690B2

(12) United States Patent
Lee (10) Patent No.: US 9,644,690 B2
(45) Date of Patent: May 9, 2017

(54) ELECTROMAGNETIC WEDGE DISCONNECT CLUTCH (71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 62 days.

(21) Appl. No.: 14/622,147

(22) Filed: Feb. 13, 2015

(65) Prior Publication Data
US 2016/0238089 A1 Aug. 18, 2016

(51) Int. Cl.
| F16D 13/14 | (2006.01) |
| F16D 27/10 | (2006.01) |
| F16D 27/11 | (2006.01) |
| F16D 43/00 | (2006.01) |
| F16D 13/06 | (2006.01) |
| F16D 13/18 | (2006.01) |
| F16D 27/102 | (2006.01) |
| F16D 41/061 | (2006.01) |
| F16D 27/108 | (2006.01) |
| F16D 41/063 | (2006.01) |
| F16D 23/12 | (2006.01) |

(52) U.S. Cl.
CPC ............ *F16D 27/10* (2013.01); *F16D 13/06* (2013.01); *F16D 13/18* (2013.01); *F16D 27/102* (2013.01); *F16D 43/00* (2013.01); *F16D 13/14* (2013.01); *F16D 27/108* (2013.01); *F16D 27/11* (2013.01); *F16D 41/061* (2013.01); *F16D 41/063* (2013.01); *F16D 2023/123* (2013.01)

(58) Field of Classification Search
CPC ...... F16D 41/061; F16D 27/10; F16D 27/108; F16D 27/11; F16D 13/22; F16D 13/14; F16D 13/06
USPC ....................................... 192/66.21
See application file for complete search history.

(56) References Cited

U.S. PATENT DOCUMENTS 710,685 A * 10/1902 Harris ..................... F16D 13/64
192/52.3
2,903,911 A * 9/1959 Hussa ..................... F16D 23/12
192/66.21

(Continued)

OTHER PUBLICATIONS

U.S. Appl. No. 61/980,974, filed Apr. 17, 2014.

*Primary Examiner* — Robert A Siconolfi
*Assistant Examiner* — Ryan Dodd
(74) *Attorney, Agent, or Firm* — Simpson & Simpson, PLLC (57) ABSTRACT A wedge clutch, including: an inner race having a radially outermost surface sloping radially outward from a first axial side to a second side; an outer race located radially outward of the inner race; a wedge plate radially disposed between the inner and outer races, the wedge plate including a radially innermost surface sloping radially outward complementary with the radially outermost surface of the inner race; and an actuation assembly arranged to displace the inner race in the first axial direction to place the wedge clutch in a locked mode in which the inner race, the wedge plate and the outer race are non-rotatably connected and in the second axial direction to place the wedge clutch in a free-wheel mode in which the inner and outer races are rotatable with respect to each other.

18 Claims, 6 Drawing Sheets (56) References Cited

U.S. PATENT DOCUMENTS

| | | | | |
|---|---|---|---|---|
| 3,677,377 A * | 7/1972 | Miller | .................... | F16D 27/11 |
| | | | | 188/71.8 |
| 2003/0019708 A1* | 1/2003 | Goto | ...................... | F16D 27/02 |
| | | | | 192/35 |
| 2015/0027840 A1* | 1/2015 | Lee | ........................ | F16D 13/16 |
| | | | | 192/45.1 |
| 2015/0152922 A1* | 6/2015 | Lee | ........................ | F16D 13/14 |
| | | | | 192/66.1 |
| 2015/0300421 A1* | 10/2015 | Lee | ........................ | F16D 15/00 |
| | | | | 475/220 |
| 2016/0084326 A1* | 3/2016 | Ramsey | ............... | F16D 41/063 |
| | | | | 192/45.1 |
| 2016/0091034 A1* | 3/2016 | Lee | ...................... | F16D 41/061 |
| | | | | 192/35 |

* cited by examiner

ELECTROMAGNETIC WEDGE DISCONNECT CLUTCH

TECHNICAL FIELD

The present invention relates generally to a wedge clutch, and, more specifically, to a wedge clutch having an electromagnet for operating the clutch.

BACKGROUND

For an all-wheel drive (AWD) disconnect system to operate, a disconnect clutch may be used in both the front and the rear of a motor vehicle. The disconnect clutch allows the center prop-shaft and the front and rear hypoid gears to cease spinning. Typically, the disconnect clutch is a splined dog clutch. However, the dog clutch requires an undesirable axial length, reduces the available differential speed of the shafts, and entails onerous actuation force requirements.

Known wedge clutches include inner and outer races and a wedge plate radially disposed between the inner and outer races. Typically, known clutches rely on the relative rotation between the inner and outer races to switch between a locked mode and a free-wheel mode for the clutch. The known actuation schemes are slower than desired and may result in the clutch being stuck in one of the operating modes.

SUMMARY

According to aspects illustrated herein, there is provided a wedge clutch, having an axis of rotation, an inner race including a first side facing a first axial direction, a second side facing a second axial direction opposite the first axial direction and a first radially outermost surface sloping radially outward from the first side to the second side, an outer race with a portion located radially outward of the inner race, a wedge plate radially disposed between the inner race and the portion of the outer race, the wedge plate including third and fourth sides facing in the first and second axial directions, respectively, and a first radially innermost surface sloping radially outward from the third side to the fourth side, and, an actuation assembly arranged to displace the inner race in the first axial direction to place the wedge clutch in a locked mode in which the inner race, the wedge plate and the outer race are non-rotatably connected, and in the second axial direction to place the wedge clutch in a free-wheel mode in which the inner and outer races are rotatable with respect to each other.

According to aspects illustrated herein, there is provided a wedge clutch, having an axis of rotation, an inner race including a first side facing a first axial direction, a second side facing a second axial direction opposite the first axial direction and a first radially outermost surface sloping radially outward from the first side to the second side, an outer race with a portion located radially outward of the inner race, a wedge plate radially disposed between the inner race and the portion of the outer race, the wedge plate including third and fourth sides facing in the first and second axial directions, respectively, and a first radially innermost surface sloping radially outward from the third side to the fourth side, and, an actuation assembly including a resilient element urging the inner race in the first axial direction; and, an electromagnet, wherein when the electromagnet is un-energized, the resilient element is arranged to displace the inner race in the first axial direction to initiate a locked mode in which the inner race, the wedge plate and the outer race are non-rotatably connected, and, when the electromagnet is energized, the electromagnet is arranged to displace the inner race in the second axial direction to initiate a free-wheel mode in which the inner and outer races are rotatable with respect to each other.

According to aspects illustrated herein, there is provided a wedge clutch, having an inner race including a first side facing a first axial direction, a second side facing a second axial direction opposite the first axial direction and a first radially outermost surface sloping radially outward from the first side to the second side, a plate of magnetic material non-rotatably connected to the inner race, an outer race with a portion located radially outward of the inner race, a wedge plate radially disposed between the inner race and the portion of the outer race, the wedge plate including: third and fourth sides facing in the first and second axial directions, respectively, a second radially innermost surface sloping radially outward from the third side to the fourth side; a second radially outermost surface including third and fourth chamfers; and, an actuation assembly including a housing, a resilient element engaged with the housing and the inner race and urging the inner race in the first axial direction, and, an electromagnet disposed within the housing, wherein when the electromagnet is un-energized, the resilient element is arranged to displace the inner race in the first axial direction to frictionally engage the first and second chamfers with the third and fourth chamfers, respectively, to non-rotatably connect the inner race, the wedge plate and the outer race, and, when the electromagnet is energized, the electromagnet is arranged to displace the plate of magnetic material in the second axial direction to initiate a free-wheel mode in which the inner and outer races are rotatable with respect to each other.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that the invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

Figure 1:
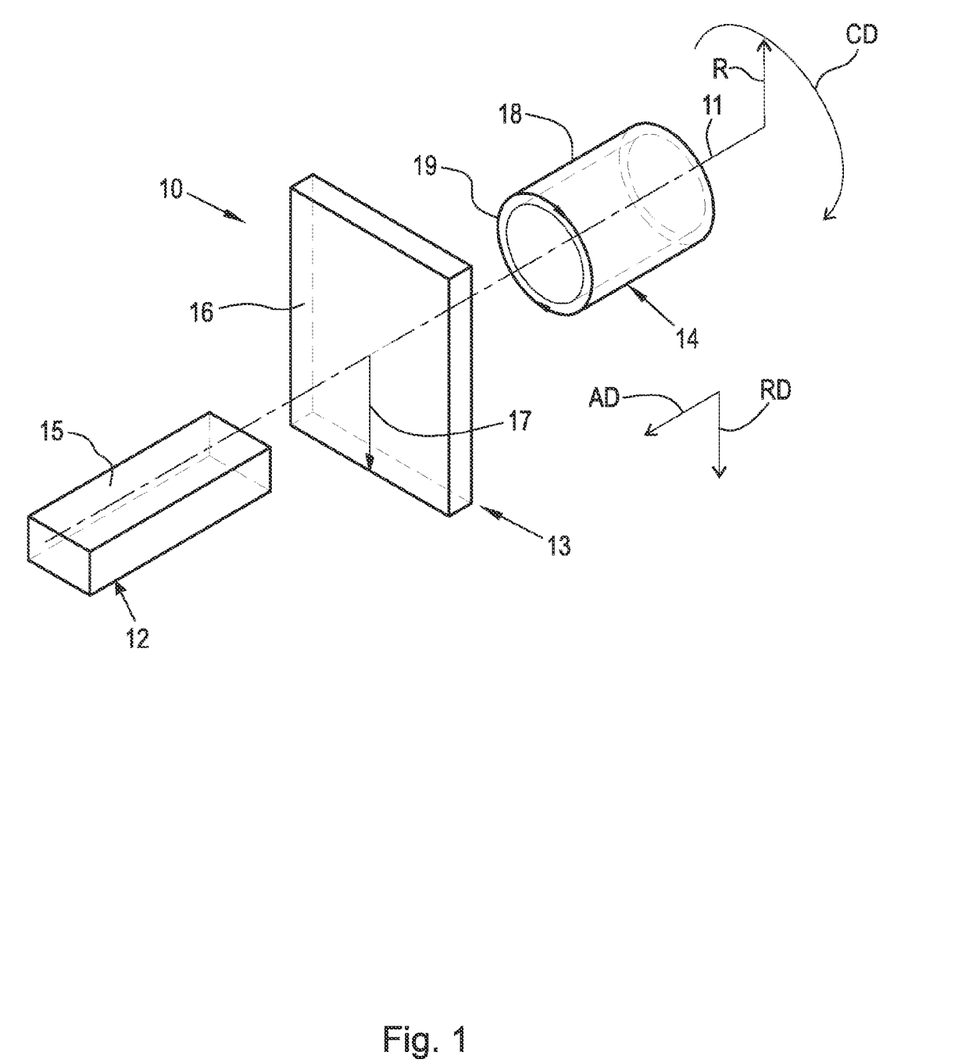
FIG. 1 is a perspective view of a cylindrical coordinate system demonstrating spatial terminology used in the present disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible FIG. 1 is a perspective view of cylindrical coordinate system 10 demonstrating spatial terminology used in the present invention. The present invention is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
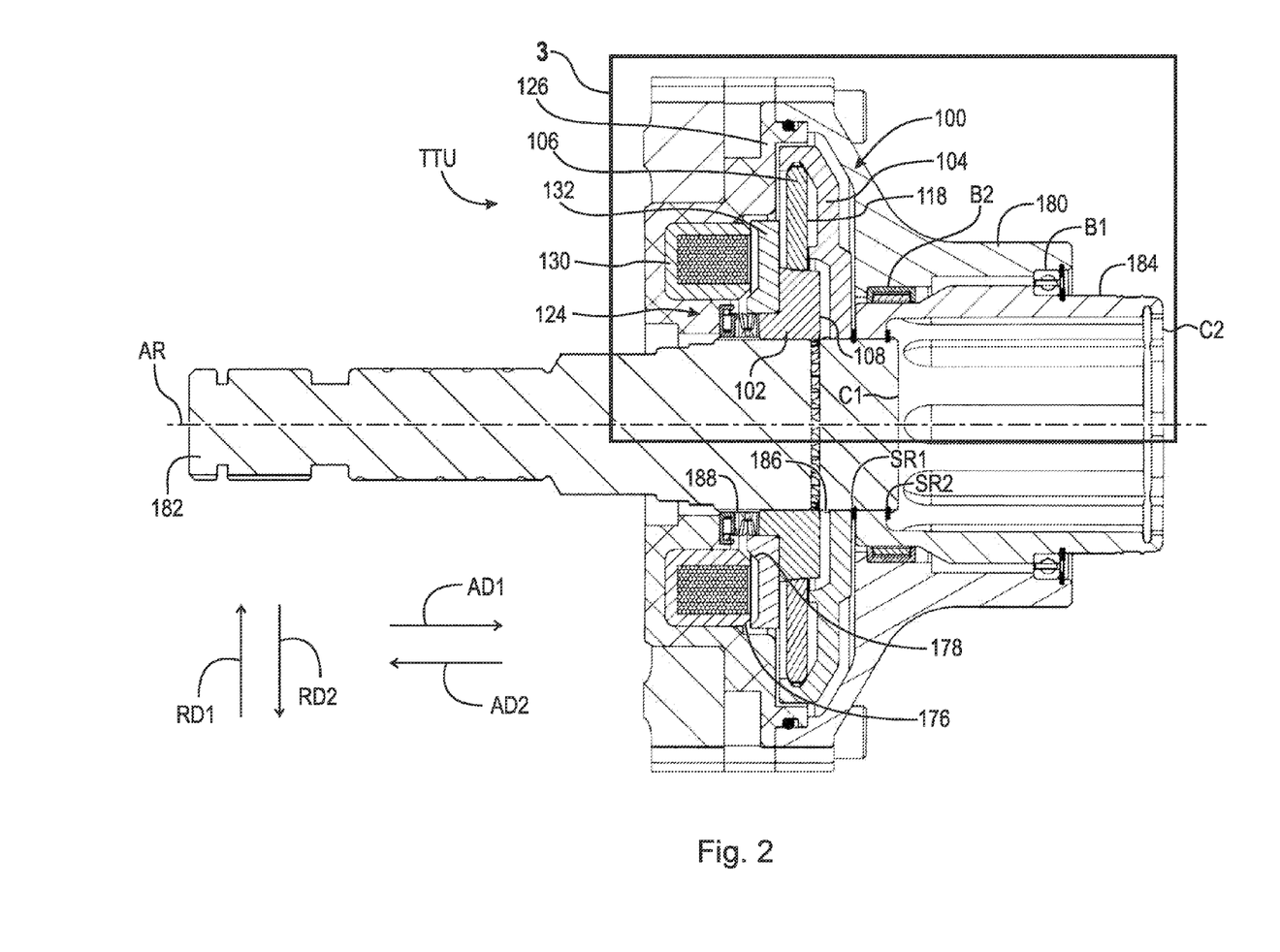
FIG. 2 is a partial cross-sectional view of a torque transfer unit having a cone clutch according to an exemplary embodiment in a locked mode.

FIG. 2 is a cross-sectional view of torque transfer unit TTU including wedge clutch 100 with an actuation assembly.

Figure 3:
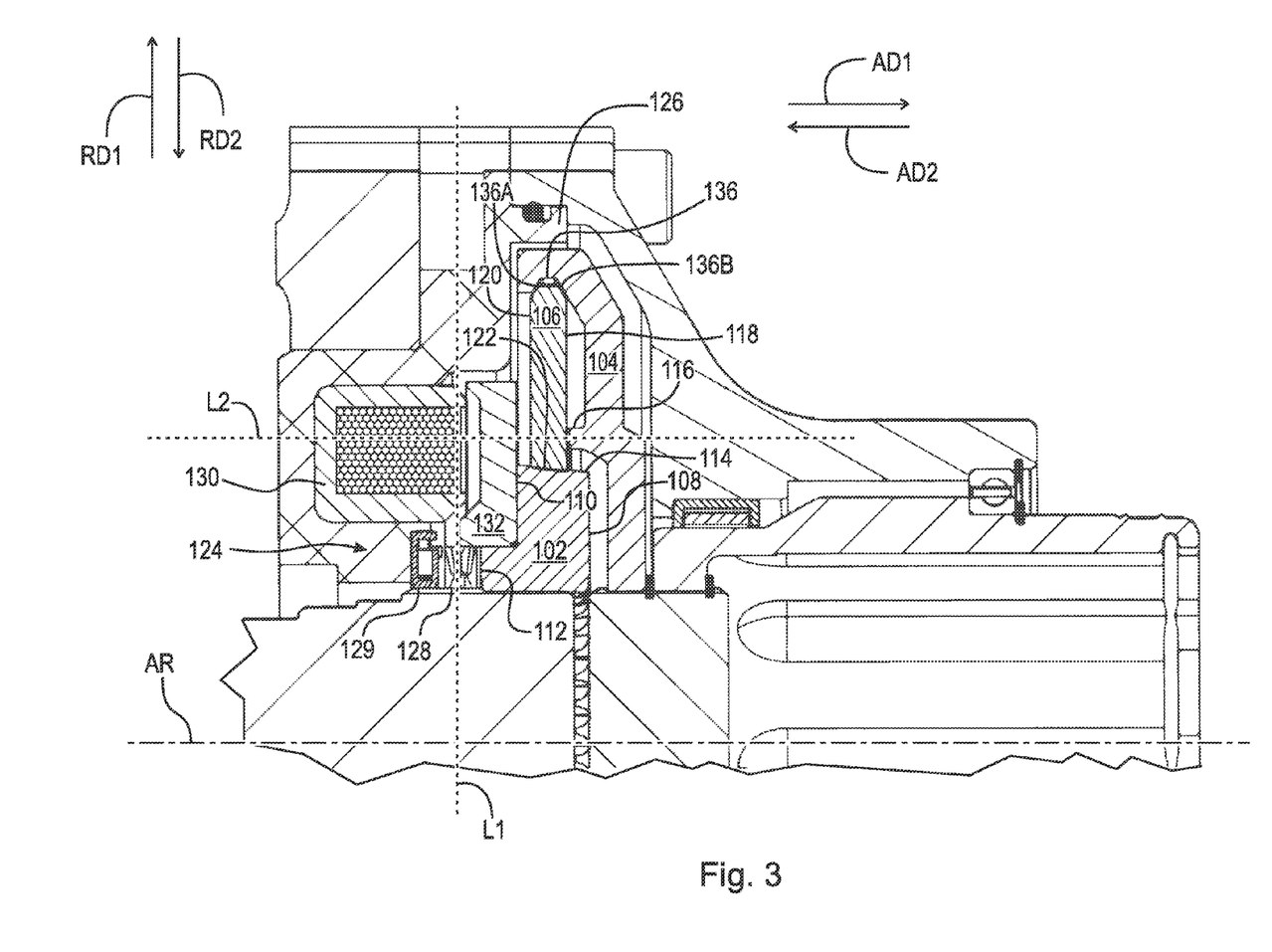
FIG. 3 is a detail of area 3 in FIG. 2 showing a locked mode for the wedge clutch.

FIG. 3 is a detail of area 3 in FIG. 2 showing a locked mode for wedge clutch 100.

Figure 4:
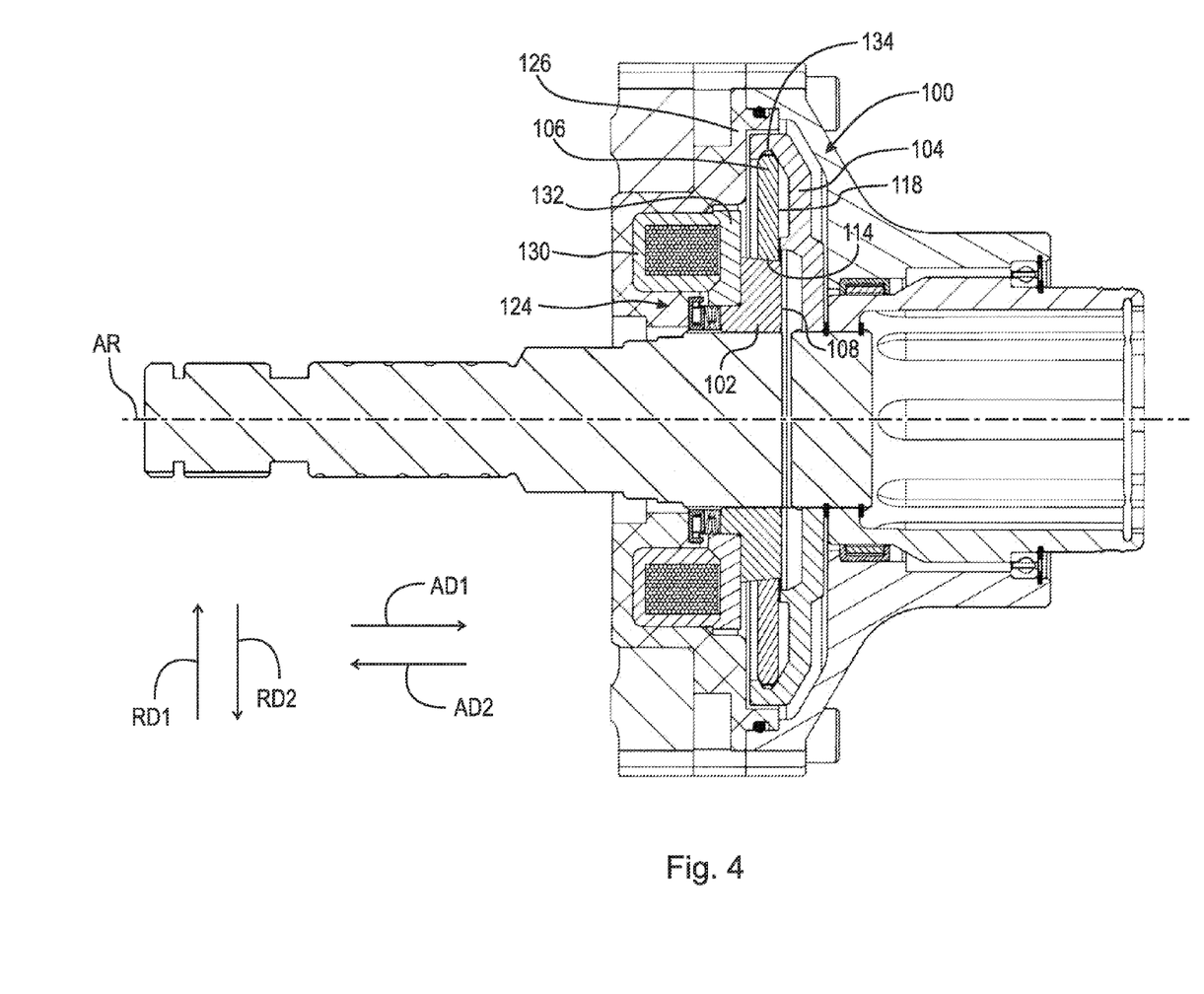
FIG. 4 is a partial cross-sectional view of a torque transfer unit having a cone clutch according to an exemplary embodiment in a freewheeling mode.

FIG. 4 is a cross-sectional view of torque transfer unit TTU including wedge clutch 100 shown in a free-wheel mode.

Figure 5:
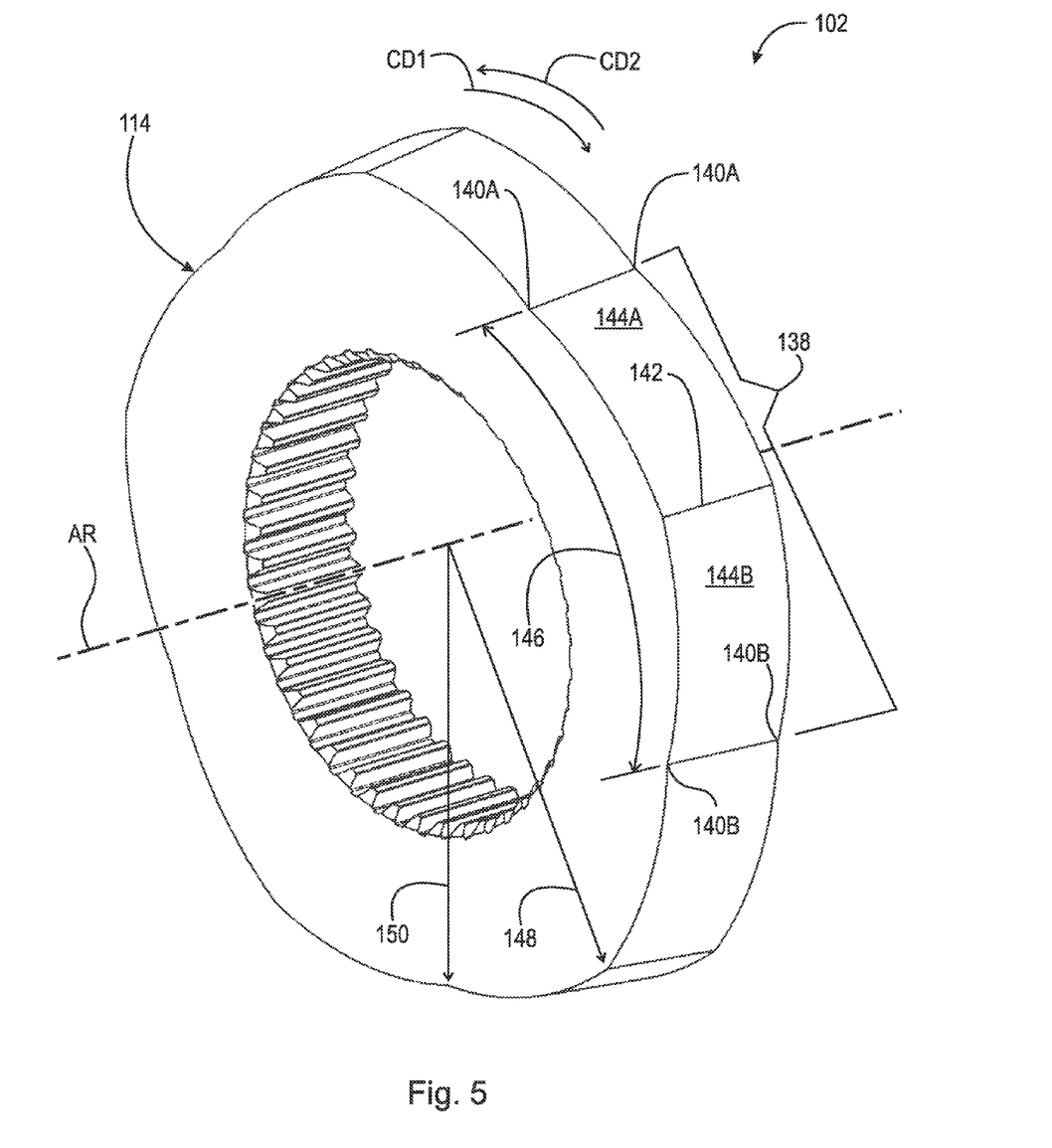
FIG. 5 is a perspective view of an inner race for a wedge clutch according to an exemplary embodiment; and, FIG. 6 is a perspective view of a wedge plate for a wedge clutch according to an exemplary embodiment.

FIG. 5 is a perspective view of an inner race for a wedge clutch according to an exemplary embodiment.

Figure 6:
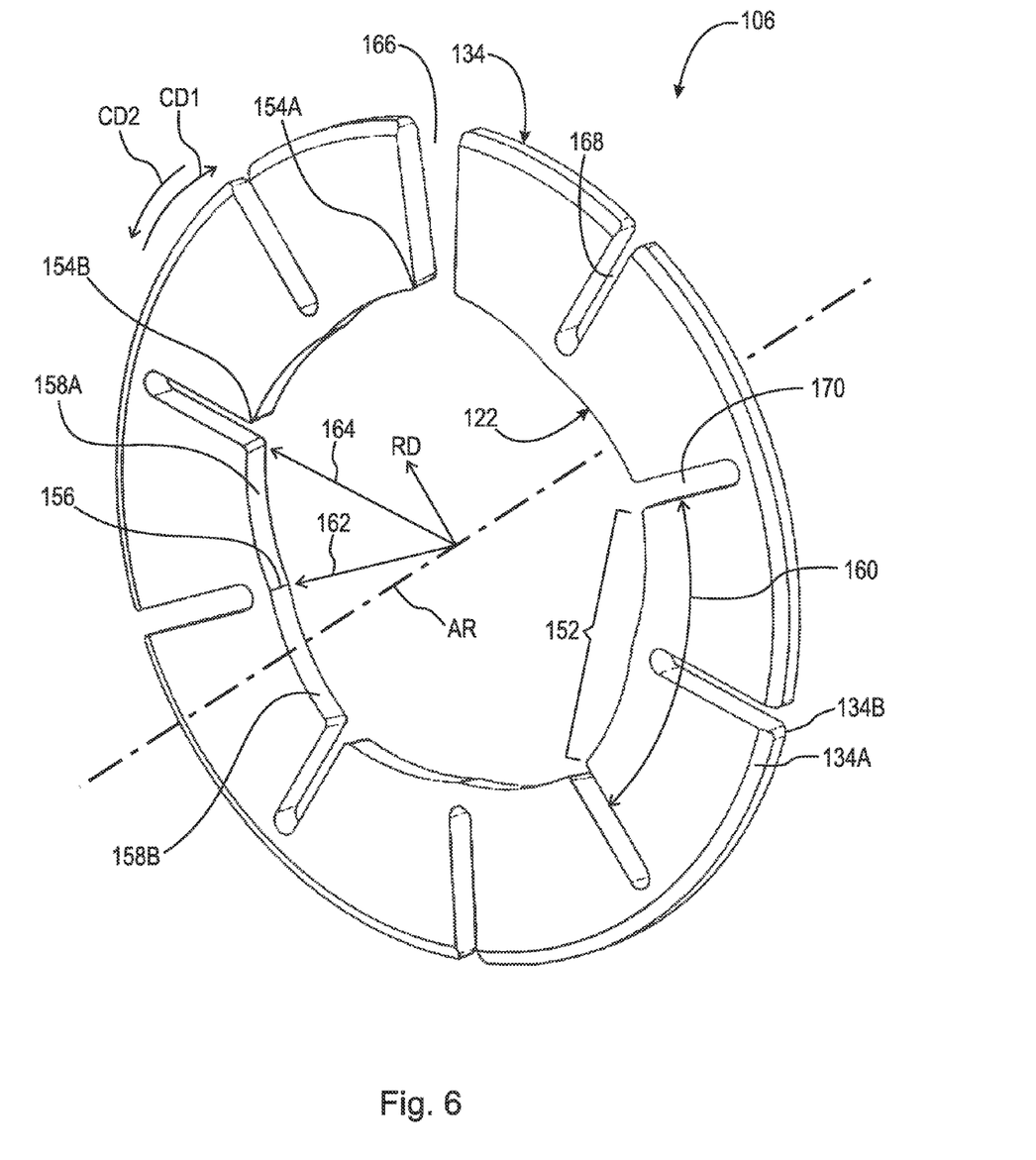

FIG. 6 is a perspective view of a wedge plate for a wedge clutch according to an exemplary embodiment.

The following should be viewed in light of FIGS. 2 through 6. Clutch 100 includes inner race 102, outer race 104, and wedge plate 106. Race 102 includes: sides 108 and 110 facing in opposite axial directions AD1 and AD2, respectively, and radially outermost surface 114 sloping radially outward from side 108 to 110. Portion 104A of race 104 is located radially outward of inner race 102. In an example embodiment, race 104 includes retention lip 116. Wedge plate 106 is radially disposed between races 102 and 104, in particular, portion 104A and includes: sides 118 and 120 facing in directions AD1 and AD2, respectively, and, radially innermost surface 122 sloping radially outward from side 118 to side 120. Clutch 100 includes actuation assembly 124.

The actuation assembly is arranged to displace race 102: in direction AD1 to place clutch 100 in a locked mode for clutch 100, in which inner race 102, wedge plate 106 and outer race 104 are non-rotatably connected; and in direction AD2 to place clutch 100 in a free-wheel mode for clutch 100, in which races 102 and 104 are rotatable with respect to each other. In an example embodiment, side 118 contacts retention lip 116 to limit movement of wedge plate 106 in first axial direction AD1.

In an example embodiment, assembly 124 is located in housing 126. In an example embodiment, assembly 124 includes resilient element 128 and electromagnet 130. Resilient element 128 is engaged with housing 126 via bearing 129 in an example embodiment, and inner race 102, and urges inner race 102 in axial direction AD1. When electromagnet 130 is energized, electromagnet 130 is arranged to displace inner race 102 in axial direction AD2 to initiate free-wheel mode. When the electromagnet is un-energized, resilient element 128 is arranged to displace inner race 102 in axial direction AD1 to initiate the locked mode. In an example embodiment, resilient element 128 is located radially inward of electromagnet 130. This is demonstrated with line L1 being orthogonal to axis of rotation AR and passing through electromagnet 130 and resilient element 128.

In an example embodiment, clutch 100 includes plate 132 made of magnetic material and fixedly connected to race 102 so that when electromagnet 130 is energized, electromagnet 130 attracts plate 132 to displace race 102 in direction AD2. By "magnetic material" we mean a material that can be attracted by a magnet. Resilient element 128 can be any suitable resilient element known in the art and electromagnet 130 can be any electromagnet known in the art. Line L2 is parallel to axis of rotation AR and passes through electromagnet 130, plate 132, and wedge plate 106.

The following provides further detail regarding clutch 100. To switch from the free-wheel mode to the locked mode, assembly 124 displaces race 102 in direction AD1. Surfaces 114 and 122 are in contact; therefore, due to increasing radial profile of surface 114 in direction AD2, surface 114 forces wedge plate 106 radially outward in radial direction RD1 until outer circumferential surface 134 of the wedge plate frictionally engages inner circumferential surface 136 of race 104, which rotationally locks wedge plate 106 with races 102 and 104.

To switch from the locked mode to the free-wheel mode, assembly 124 displaces race 102 in direction AD2. Surfaces 114 and 122 and 134 and 136 are in contact in the locked mode. Due to decreasing radial profile of surface 114 in direction AD1, the force on wedge plate 106 in direction RD1 is relieved and relative rotation between race 104 and wedge plate 106 breaks the frictional engagement of outer circumferential surface 134 and inner circumferential surface 136, enabling relative rotation between races 102 and 104.

In an example embodiment, surface 134 is chamfered and includes segments 134A and 134B. In an example embodiment, surface 136 is a groove in race 104 and includes matching segments 136A and 136B.

In an example embodiment, the actuation stroke for assembly 124 is 3 mm or smaller and thus can be very fast and require low energy.

Wedge plate clutch 100 can be used on one side of a Rear Drive Module (RDU) of a motor vehicle in order to disconnect the rear drive-shaft of that side. This enables both wheels to rotate the drive-shafts. However, because the drive-shaft is now split, the differential spider gears will spin rather than transmitting torque to the ring gear. This results in the differential ring gear being stationary instead of driving the prop shaft. To enable transmission of torque to the rear wheels, clutch 100 is closed.

In an example embodiment, surface 114 includes segments 138. Each segment 138 includes respective ends 140A and 140B and respective center portion 142 located between ends 140A and 140B in circumferential direction CD1. Ramps 144A and 144B are formed between ends 140A and portion 142 and ends 140B and portion 142, respectively. Ends 140A and 140B define circumferential extent 146 of a respective segment 138. Each center portion 142 is at radial distance 148 from axis AR and ends 140A and 140B are at radial distance 150, less than distance 148, from axis AR. Thus, center portions 142 extend radially outward further than ends 140A and 140B.

In an example embodiment, surface 122 includes segments 152. Each segment 152 includes respective ends 154A and 154B and respective center portion 156 located between ends 154A and 154B in circumferential direction CD1. Ramps 158A and 158B are formed between ends 154A and portion 156 and ends 154B and portion 156, respectively. Ends 154A and 154B define circumferential extent 160 of a respective segment 152. Each center portion 156 is at radial distance 162 from axis AR and ends 154A and 154B are at radial distance 164, greater than distance 162, from axis AR. Thus, center portions 156 extend radially inward further than ends 154A and 154B.

The following provides further detail regarding clutch 100. In general, wedge plate 106 is biased radially inward so that surface 114 and 122 are in contact, in particular, ramps 144A and 144B are in contact with ramps 158A and 158B, respectively. The biasing of plate 106 and the radial expansion and contraction of plate 106 described below is enabled by gap 166 and slots 168 and 170. In the free-wheel mode, the complimentary slopes of surfaces 114 and 122 and the contact of the ramps result in outer circumferential surface 134 being radially inward of inner circumferential surface 136 by a sufficient amount to eliminate or reduce the frictional contact between surfaces 134 and 136. As a result the lack of frictional contact between surfaces 134 and 136, inner race 102 and wedge plate 106 are rotatable with respect to outer race 104.

To switch from the free-wheel mode to the locked mode, assembly 124 displaces race 102 in direction AD1. The complimentary slopes of surfaces 114 and 122 result in outer circumferential surface 134 being displaced radially outward to frictionally engage inner circumferential surface 136. As a result of the frictional contact between surfaces 134 and 136, race 104 causes wedge plate 106 to rotate with respect to inner race 102. Regardless of the relative rotation of races 102 and 104 with respect to each other, points 142 and 156 move toward each other. For example, for rotation of wedge plate 106 with respect to race 102 in circumferential direction CD1, ramps 158A slide up ramps 144A forcing surface 134 radially outward. For example, for rotation of wedge plate 106 with respect to race 102 in circumferential direction CD2, ramps 158B slide up ramps 144B, forcing surface 134 radially outward. Once the ramps have slid far enough, wedge plate 106 is non-rotatably connected to races 102 and 104 by force in radial direction RD. Continued relative rotation strengthens the force, increasing torque carrying capacity of clutch 100.

In an example embodiment, electromagnet 130 includes chamfered surfaces 176 and plate 166 includes chamfered surfaces 178, which mating engage with surfaces 176 in the free-wheel mode.

In an example embodiment, TTU includes housing 180, input shaft 182 and output shaft 184. Bearings B1 and B2 enable rotation of housing 180 with respect to output shaft 184. Snap rings SR1 and SR2 axially fix component C1 of shaft 184 with respect to component C2 of shaft 184. Component C1 is non-rotatably connected to race 104 by splines 186 on race 104. Race 102 is non-rotatably connected to shaft 182 by splines 188 on race 102, which enable axial displacement of race 102 with respect to shaft 182.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
   an axis of rotation;
   an inner race including:
      a first side facing a first axial direction;
      a second side facing a second axial direction opposite the first axial direction; and,
      a first radially outermost surface sloping radially outward from the first side to the second side;
   an outer race including a portion located radially outward of the inner race;
   a wedge plate radially disposed between the inner race and the portion of the outer race, the wedge plate including:
      third and fourth sides facing in the first and second axial directions, respectively;
      a first radially innermost surface sloping radially outward from the third side to the fourth side; and,
      a second radially outermost surface including first and second chamfers between the third and fourth sides, the outer race includes a second radially innermost surface including third and fourth chamfers arranged to contact the first and second chamfers of the wedge plate, respectively, in a locked mode; and,
   an actuation assembly arranged to displace the inner race:
      in the first axial direction to place the wedge clutch in the locked mode in which the inner race, the wedge plate and the outer race are non-rotatably connected; and,
      in the second axial direction to place the wedge clutch in a free-wheel mode in which the inner and outer races are rotatable with respect to each other.

2. The wedge clutch of claim 1, wherein the outer race has an axially extending lip to contact the wedge plate to limit movement of the wedge plate in the first axial direction.

3. The wedge clutch of claim 1, further comprising:
   a housing, wherein the actuation assembly includes a resilient element:
      engaged with the housing and the inner race; and,
      urging the inner race in the first axial direction.

4. The wedge clutch of claim 1, further comprising:
a housing, wherein:
  the actuation assembly includes an electromagnet and a resilient element disposed within the housing;
  to initiate the locked mode, the electromagnet is arranged to be un-energized and the resilient element is arranged to displace the inner race in the first axial direction; and,
  to initiate the free-wheel mode, the electromagnet is arranged to be energized to displace the inner race in the second axial direction.

5. The wedge clutch of claim 4, further comprising:
a first plate of magnetic material non-rotatably connected to the inner race, wherein, the electromagnet is arranged to attract the first plate.

6. The wedge clutch of claim 1, further comprising:
a housing, wherein:
  the actuation assembly includes:
    a resilient element:
      engaged with the housing and the inner race; and,
      urging the inner race in the first axial direction; and,
    an electromagnet disposed within the housing;
  to initiate the locked mode, the electromagnet is arranged to be un-energized and the resilient element is arranged to displace the inner race in the first axial direction; and,
  to initiate the free-wheel mode, the electromagnet is arranged to be energized to displace the inner race in the second axial direction.

7. A wedge clutch, comprising:
an axis of rotation;
an inner race including:
  a first side facing a first axial direction;
  a second side facing a second axial direction opposite the first axial direction; and,
  a first radially outermost surface sloping radially outward from the first side to the second side;
an outer race including a portion located radially outward of the inner race;
a wedge plate radially disposed between the inner race and the portion of the outer race, the wedge plate including:
  third and fourth sides facing in the first and second axial directions, respectively; and,
  a first radially innermost surface sloping radially outward from the third side to the fourth side; and,
an actuation assembly including:
  a resilient element urging the inner race in the first axial direction; and,
  an electromagnet, wherein:
to initiate a locked mode in which the inner race, the wedge plate and the outer race are non-rotatably connected to each other the electromagnet is arranged to be un-energized and the resilient element is arranged to displace the inner race in the first axial direction and displace the wedge plate radially outward; and,
to initiate a free-wheel mode in which the inner and outer races are rotatable with respect to each other the electromagnet is arranged to be energized to displace the inner race in the second axial direction.

8. The wedge clutch of claim 7, wherein the outer race has an axially extending lip to contact the wedge plate to limit movement of the wedge plate in the first axial direction.

9. The wedge clutch of claim 7, further comprising:
a first plate of magnetic material non-rotatably connected to the inner race, wherein, the electromagnet is arranged to attract the first plate.

10. The wedge clutch of claim 9, wherein a line parallel to the axis of rotation passes through the electromagnet, the first plate, and the wedge plate.

11. The wedge clutch of claim 7, wherein the wedge plate has a second radially outermost surface including first and second chamfers between the third and fourth sides.

12. The wedge clutch of claim 11, wherein the outer race has a second radially innermost surface including third and fourth chamfers arranged to contact the first and second chamfers of the wedge plate in the locked mode.

13. The wedge clutch of claim 7, wherein the resilient element is located radially inward of the electromagnet.

14. The wedge clutch of claim 7, wherein a line orthogonal to the axis of rotation passes through the electromagnet and the resilient element.

15. A wedge clutch, comprising:
an inner race including:
  a first side facing a first axial direction;
  a second side facing a second axial direction opposite the first axial direction; and,
  a first radially outermost surface sloping radially outward from the first side to the second side;
a first plate of magnetic material non-rotatably connected to the inner race;
an outer race with a portion located radially outward of the inner race and having a first radially innermost surface including first and second chamfers;
a wedge plate radially disposed between the inner race and the portion of the outer race, the wedge plate including:
  third and fourth sides facing in the first and second axial directions, respectively;
  a second radially innermost surface sloping radially outward from the third side to the fourth side; and,
  a second radially outermost surface including third and fourth chamfers; and,
an actuation assembly including:
  a housing;
  a resilient element:
    engaged with the housing and the inner race; and,
    urging the inner race in the first axial direction; and,
  an electromagnet disposed within the housing, wherein:
to non-rotatably connect the inner race, the wedge plate and the outer race the electromagnet is arranged to be un-energized and the resilient element is arranged to displace the inner race in the first axial direction to frictionally engage the first and second chamfers with the third and fourth chamfers, respectively; and,
to initiate a free-wheel mode in which the inner and outer races are rotatable with respect to each other the electromagnet is arranged to be energized to displace the first plate of magnetic material in the second axial direction.

16. The wedge clutch of claim 15, wherein the outer race has an axially extending lip to contact the wedge plate to limit movement of the wedge plate in the first axial direction.

17. The wedge clutch of claim 15, wherein the electromagnet is arranged to attract the first plate.

18. The wedge clutch of claim 15, wherein the resilient element is located radially inward of the electromagnet.

* * * * *